United States Patent [19]
Morrison

[11] 3,906,482
[45] Sept. 16, 1975

[54] BINARY-SIGNAL DISPLAY EMPLOYING A MATRIX OF ILLUMINATIVE ELEMENTS

[76] Inventor: Ralph Morrison, 2787 Yorkshire Rd., Pasadena, Calif. 91107

[22] Filed: Mar. 6, 1974

[21] Appl. No.: 448,679

[52] U.S. Cl. .......................... 340/324 R; 340/168 S
[51] Int. Cl.² ......................................... G06F 3/14
[58] Field of Search ..... 340/324 R, 324 M, 166 EL, 340/168 S

[56] References Cited
UNITED STATES PATENTS

| | | |
|---|---|---|
| 3,225,342 | 12/1965 | Clark .............................. 340/324 R |
| 3,634,849 | 1/1972 | Nishizawa et al. ............ 340/166 EL |
| 3,765,011 | 10/1973 | Sawyer et al. ................ 340/166 EL |
| 3,792,465 | 2/1974 | Collins et al. ..................... 340/168 S |

*Primary Examiner*—Marshall M. Curtis
*Attorney, Agent, or Firm*—Christie, Parker & Hale

[57] ABSTRACT

A pulse pattern being defined by a time-varying, binary-valued electrical input signal is dynamically displayed by selectively illuminating light-emitting elements that are arranged in a matrix comprising a pair of rows and a plurality of columns. Display sweep circuitry provides a column addressing signal that one-by-one identifies each column. In response to the input signal, a row addressing signal is produced to identify one or the other row depending upon the binary value of the input signal.

11 Claims, 6 Drawing Figures

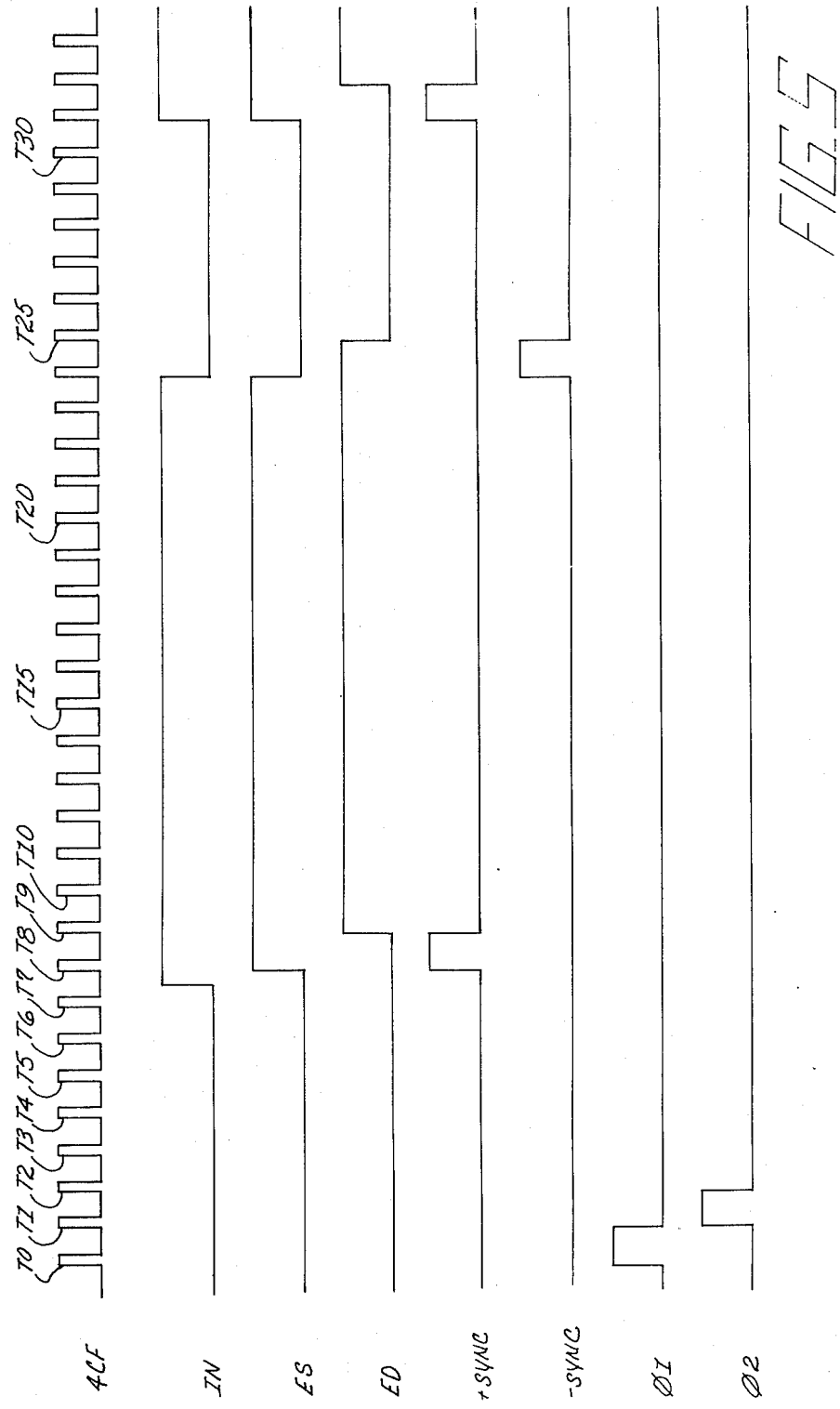

BINARY-SIGNAL DISPLAY EMPLOYING A MATRIX OF ILLUMINATIVE ELEMENTS

BACKGROUND OF THE INVENTION

This invention relates to displays for time-varying binary-valued electrical signals.

In many instances, as for example in the testing of electronic digital equipment, it is desirable to provide a visual display of the pattern of a time-varying, binary-valued electrical signal such as the output signal of a flip-flop, logic gate, and the like. The cathode ray tube oscilloscope is by far the most common instrument used for this purpose.

The oscilloscope is of course a very versatile instrument and provides for the display of signals having widely varying wave-shapes. In the testing of electronic digital equipment, however, apart from the relatively few instances in which rise times and fall times are of interest, the only relevant information about a particular signal is which of two binary values, such as true or false, that the signal has assumed at a particular point in time. Thus, in most instances the oscilloscope is a much more powerful instrument than is needed to meet the task of displaying digital signal patterns.

Moreover, oscilloscopes, even the modern transistorized versions, are relatively bulky and generally quite expensive. This is so in part because the cathode ray display tube requires relatively high voltages and accordingly high voltage power supplies must be provided. Also, the sweep generation circuitry that controls the tube so that the beam sweeps across the tube is complex and expensive. Inasmuch as analog signals such as linearly varying ramps must be generated to control the tube, it is not feasible to employ the compact and now relatively inexpensive digital integrated circuit chips in the sweep generation circuitry. Significant, too, is the amount of power consumed by an oscilloscope.

In another approach to the display of time-varying, binary-valued signals, there are provided rows of light bulbs on a display panel. In this approach each light bulb provides for the display of a different signal with the light being on when the corresponding signal is true for example and being off when the signal is false. Whereas the oscilloscope provides more information than is generally needed, this type of display, while useful for some purposes, provides only the sketchiest amount of information. That is, as a particular signal switches back and forth between binary values, the corresponding light bulb merely flickers and it is impossible to discern the details of a particular pattern.

Another type of display unit employing light bulbs is disclosed in U.S. Pat. No. 3,411,151. This display unit provides for the static display of an arbitrarily pre-selected digital signal pattern. Toggle switches are provided for controlling a multi-source pulse generator so as to generate the desired pattern and the light bulbs are illuminated in accordance with the position of the toggle switches. This unit, however, is limited in that it displays only patterns that are pre-selected in advance and cannot detect changes in a signal under investigation and dynamically display the changes in the manner of a sweeping light.

SUMMARY OF THE INVENTION

The apparatus of this invention provides for displaying a pulse pattern defined by a time-varying, binary-valued electrical input signal. It includes a display in which a plurality of electrically-controllable illuminative elements are arranged in a matrix having at least first and second rows and a plurality of columns. Advantageously, each element is a light-emitting diode and a plurality of the diodes are included within a single integrated circuit chip.

The apparatus includes display sweep circuitry that, in contrast to a conventional oscilloscope, is constructed of digital circuitry, there being no need to generate high voltage linear ramps according to the invention. The sweep circuitry includes circuit means responsive to sequentially occurring pulses for generating in parallel a plurality of time-varying, binary-valued control signals that together define a column addressing signal that one-by-one identifies each column. Preferably, each control signal has a half-select value as one of its binary values, and the control signals on a one at a time basis each sequentially assume the half-select value.

An electrical probe is provided for sensing the electrical input signal. The probe and a bi-level sensing circuit responsive thereto provide a row addressing signal that varies in time to identify the first row when a first binary value is sensed and to identify the second row when a second, opposite binary value is sensed. (Hereinafter, the row and column addressing signals are sometimes referred to as row and column selection indications. This terminology as used herein with respect to control or gating signals does not connote a visual display thereof.) Preferably, the row selection indication is defined by first and second parallel, binary-valued gating signals, the first gating signal assuming a half-select value each time the first binary value is sensed and the second gating signal assuming a half-select value each time the second binary value is sensed. The apparatus includes circuit means responsive to the row selection indication and the column selection indication for controlling the illuminative elements to produce a visual display corresponding to the pulse pattern.

In accordance with either of two embodiments disclosed herein, each element in the first and second row is electrically connected within a separate one of a plurality of display circuits. Each display circuit has first and second terminals and, in response to the coincidence of half-select values of signals coupled to its terminals, causes its element to light up. The first terminals of the display circuits for each column are coupled to receive a respective one of the control signals. The second terminal of each display circuit for the first row is coupled to receive the first gating signal, and the second terminal of each display circuit for the second row is coupled to receive the second gating signal. Accordingly, the elements are selectively illuminated by the coincidence of half-select values for the control and gating signals.

According to a significant preferred feature, the display includes third and fourth rows of elements that provide for displaying transitions. The sweep circuitry provides half-select control signals to these rows in the same manner as to the first two rows. The gating signals for the third and fourth rows, however, are provided by a transition detector circuit arrangement.

BRIEF DESCRIPTION OF THE DRAWINGS

FIG. 5 is a group of timing diagrams illustrating the operation of the apparatus.

DETAILED DESCRIPTION

Figure 1:
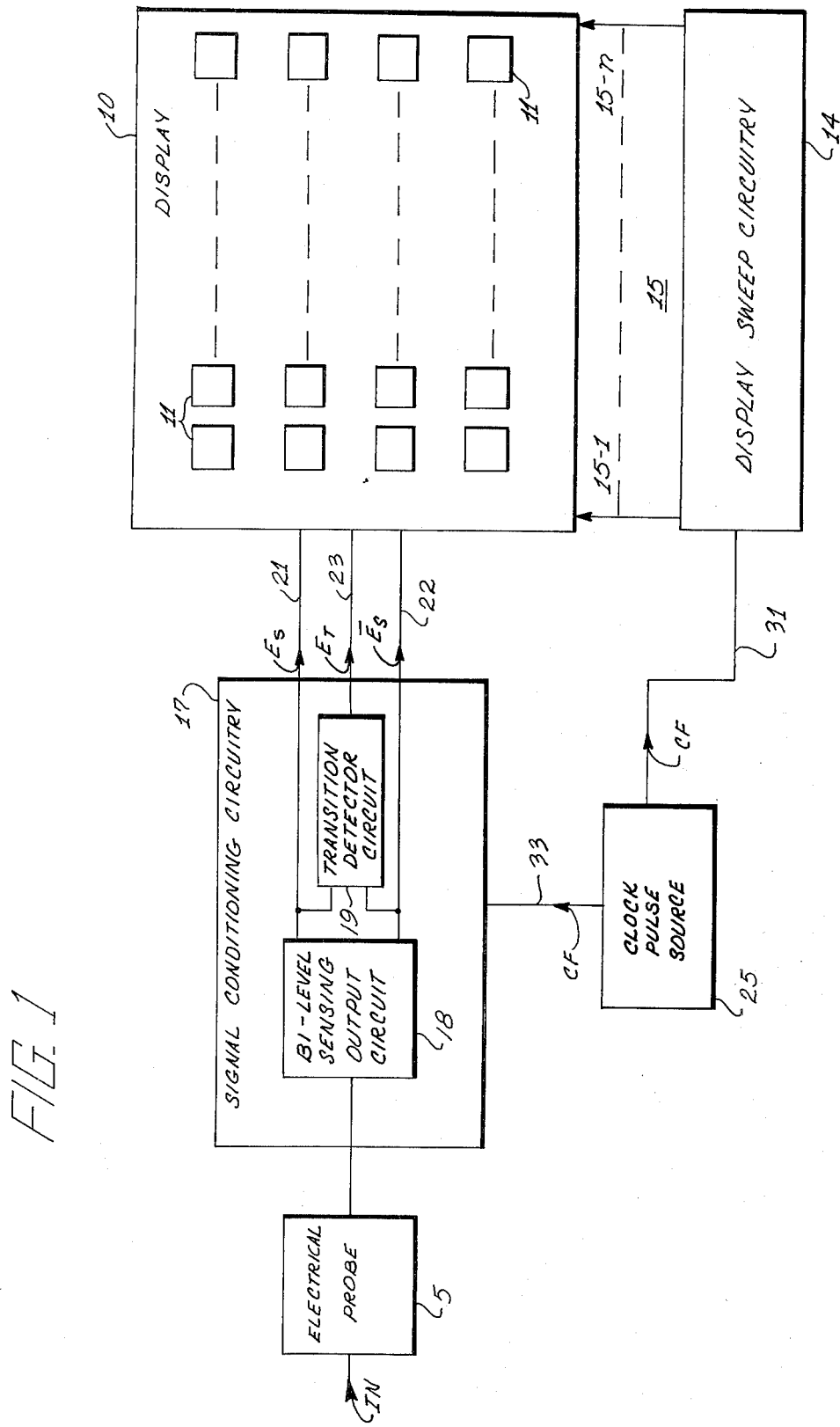
FIG. 1 is a general block diagram of the apparatus of this invention.

The apparatus of this invention is shown in general block diagram form in FIG. 1. The apparatus provides for sensing an external electrical signal by means of a probe 5. The external signal is of the type produced by a flip-flop, logical gate or the like, and switches back and forth between opposite binary values so as to define a pattern of pulses.

Figure 2:
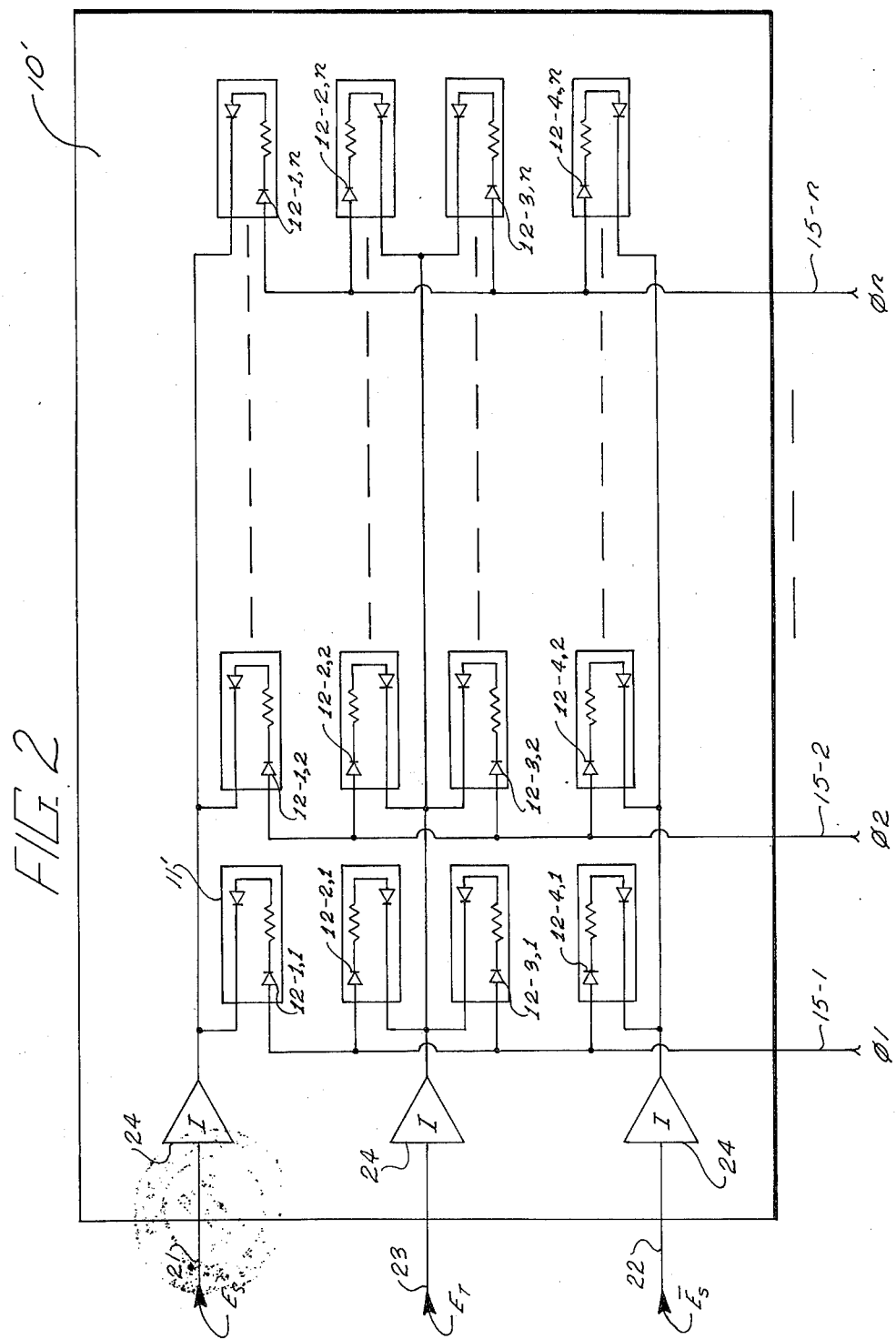
FIG. 2 is a block and schematic diagram of a display used in a first embodiment.
Figure 3:
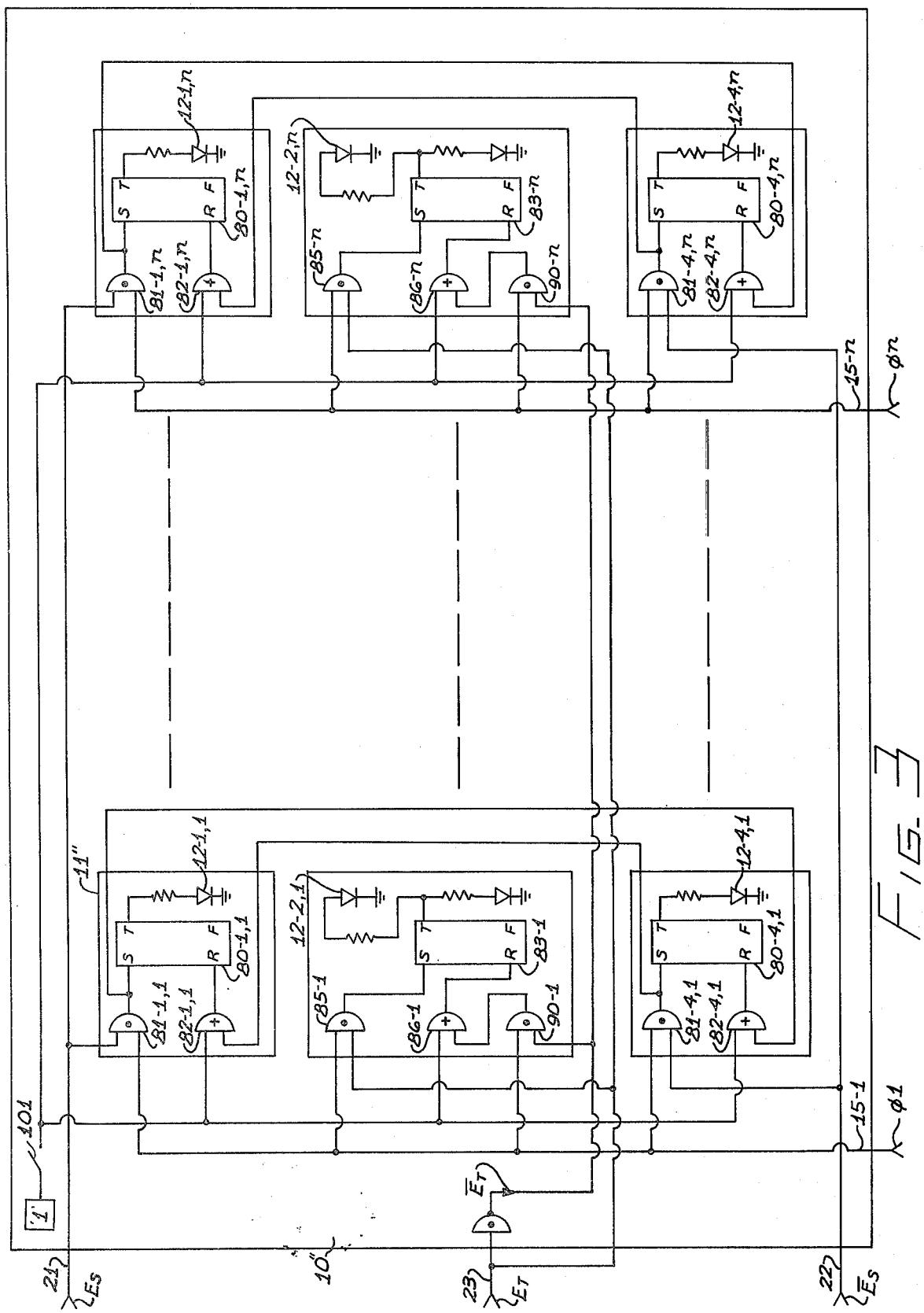
FIG. 3 is a block and schematic diagram of a display used in a second embodiment.

The apparatus includes a display 10 on which the time-varying, binary-valued pulse pattern is displayed. Preferably, the display includes a plurality of display circuits 11. FIGS. 2 and 3 show separate circuit arrangements for the display circuits used in two different embodiments. In either case, the display includes a plurality of electrically-controllable illuminative elements that are arranged in a matrix having at least first and second rows and a plurality of columns. Each element is electrically connected within a separate one of the display circuits. Advantageously, each element is a light emitting diode (LED) that lights up while it is forward biased so that current passes between its anode and cathode.

Each display circuit has two terminals to receive binary-valued signals which control whether the display circuit causes its LED to emit light. Each of these binary-valued controlling signals has a half-select value as one of its binary values. The term "half-select value" is used herein in a logical or digital sense and not in an absolute or analog sense. That is, the half-select values of two different controlling signals need not, and in the embodiment of FIG. 2 do not, equal each other. The significance of the half-select values is that the two different controlling signals applied to the two terminals of a display circuit must, in coincidence, assume their respective half-select values in order for the corresponding LED to emit light. Thus, this is somewhat analogous to the half-select currents used in addressing magnetic core memories.

Preferably, a plurality of the LED's are formed on a single substrate by means of well-known integrated circuit technology. An example of a single substrate arrangement of a plurality of LED's is disclosed in U.S. Pat. No. 3,517,258. It should be noted that with this arrangement, the "terminals" of an LED are formed in the substrate and are not to be confused with soldering posts or the like. Another example is the multi-diode chips manufactured by Hewlett Packard, called "Numeric and Hexidecimal Indicators," and sold under the designation 5082-7300 series.

A significant advantage of packaging the LED's in this way is that a compact array of a great number of diodes can be formed, and with present technology, this can be done relatively inexpensively. While the exact number of LED's is a matter of design choice, preferably hundreds are used.

In a first embodiment, as shown in FIG. 2, each display circuit in display 10' is a series circuit formed by a series connected LED, current limiting resistor, and reverse voltage protection diode. Each series circuit has first and second terminals to receive binary-valued signals which control the lighting-up of the LED.

As was mentioned above, it is contemplated that a large number, preferably hundreds, of LED's be used. Since so many LED's are used, they are not all shown in FIG. 2. Instead, representative ones are shown and the existence of the others is indicated by dashed lines.

Each LED shown in FIG. 2 is identified by a reference numeral that is expressed in matrix notation. By way of example, reference numeral 12-1,1 identifies the one of the LED's 12 that is in a first row and a first column.

According to the invention, the LED's are arranged into at least two rows. These two rows are defined by the diodes 12-1,1 through 12-1,$n$ and 12-4,1 through 12-4,$n$. Thus, in each column of the display, there are at least a pair of LED's one LED in a first row for displaying a first binary value such as true and another LED in a second row for displaying a second, opposite binary value such as false.

Preferably, the LED's are arranged into four rows, the two additional rows being preferred so as to facilitate recognition of transitions between opposite binary values of the displayed pattern. These two additional rows are defined by the LED's 12-2,1 through 12-2,$n$ and 12-3,1 through 12-3,$n$.

The display 10' is connected to display sweep circuitry 14 (FIG. 1) by a bus 15 comprising a plurality of signal leads 15-1 through 15-$n$. The signal leads of the bus 15 carry in parallel a plurality of time-varying, binary-valued control signals that together define a column selection indication. The half-select value for each of these control signals is a positive voltage of 5 volts for example, with the opposite binary value being ground or 0 volts for example.

The display 10' is also connected to signal conditioning circuitry 17 (FIG. 1) which includes a bi-level sensing output circuit 18 and a transition detector circuit 19. Signal leads 21 and 22 carry signals from the circuit 18 so as to gate two of the rows in the display, and a signal lead 23 carries gating signals from the circuit 19 so as to gate two other rows. The bi-level sensing output circuit 18 is responsive to the probe to apply complementary signals $E_S$ and $\overline{E}_S$ to the signal leads 21 and 22 respectively. Each of the signals $E_S$ and $\overline{E}_S$ is time-varying and binary-valued with one of the binary values corresponding to a half-select value. In combination, these signals define a row selection indication. Inverters 24 are provided in the display 10' so as to provide the actual gating signals. The half-select value for each of these gating signals in accordance with this embodiment is ground or 0 volts for example, with the opposite binary value being 5 volts for example.

In operation, in circumstances in which the signal $E_S$ assumes its value (i.e., 5 volts) which corresponds to a half-select value (i.e., 0 volts) for the corresponding gating signal provided by the inverter and, at the same time, the control signal carried by signal lead 15-1 assumes its half-select value (i.e., 5 volts), then LED 12-1,1 emits light. This occurs because a current flow path is established in a direction from the display sweep circuitry 14, through the signal lead 15-1, the LED 12-1,1, a series-connected current limiting resistor and reverse-voltage protection diode, and the inverter connected to the signal lead 21. Thus, the LED 12-1,1, in response to the coincidence of half-select values for the control signal and the gating signal coupled to its anode and cathode, emits light. Each of the LED's respond in like manner to their corresponding control and gating signals.

Figure 4A:
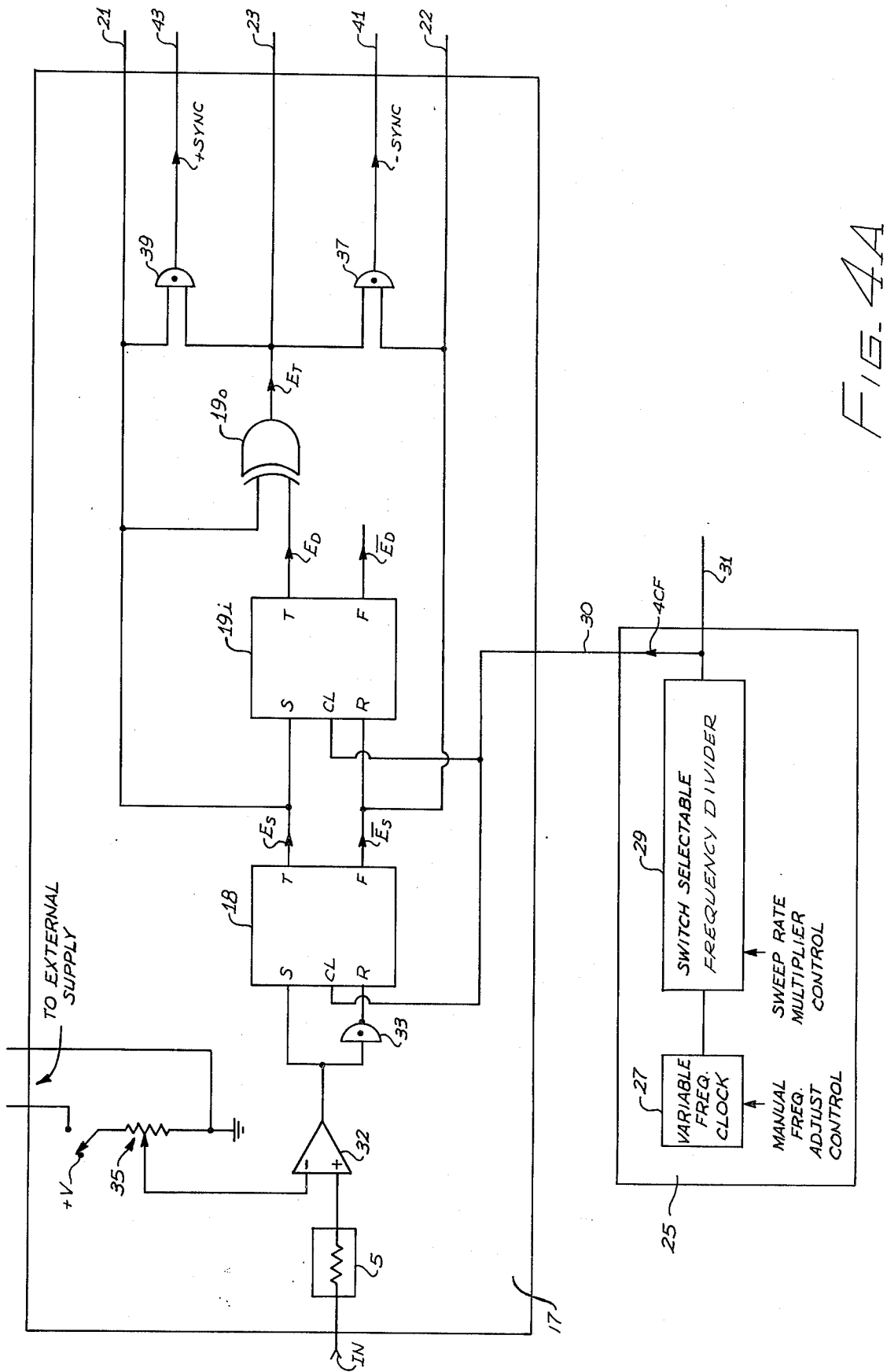
FIGS. 4A and 4B are block diagrams showing details of that portion of the apparatus that controls the display.

According to the invention, a clock pulse source 25 provides sequentially occurring pulses to the display sweep circuitry. Preferably, as shown in FIG. 4A, the source 25 includes a variable frequency clock 27 having a range within which its pulse repetition frequency is continuously adjustable. The clock 27 drives a switch selectable frequency divider 29 that serves as a sweep multiplier. The divider 29 is a conventional digital counting circuit that provides an output pulse train (4CF) whose pulse repetition frequency is a selected sub-multiple of the pulse repetition frequency of the clock 27. Advantageously, there are provided conventional manual controls such as a potentiometer for the clock 27 and a selection switch for the sweep multiplier whereby an operator can select a desired sweep time. The output of the divider 29 is identified as 4CF and its timing diagram is illustrated in FIG. 5.

The clock pulses produced in the presently preferred embodiment each comprise as a leading edge a transition from 0 volts to +5 volts. These pulses are applied to the sweep circuitry 14 via a signal lead 30 and also to the signal conditioning circuitry 17 via a signal lead 31 so as to synchronize their operation.

Within the circuitry 17 there are two conventional clocked R-S type flip-flops 18 and 19i, each of which is triggered by the pulse train 4CF. The flip-flop 18 has its S input directly connected to the output of a comparator circuit 32 and its R input connected to an inverter 33. The input of the inverter 33 is also connected to the output of the comparator 32; thus, the signals applied to the S and R inputs of the flip-flop 18 are complementary.

The operation of the flip-flop 18 is as follows.

With a binary value of '1' (e.g., +5 volts) being applied to its S input and a binary value of '0' (e.g., 0 volts) being applied to its R input, at a time when a '0' to '1' transition occurs in its clocking signal (i.e., 4CF), then after this transition the flip-flop provides a '1' binary value at its T output and a '0' binary value of its F output. And, of course, with opposite binary-valued inputs being applied, opposite binary-valued outputs are provided.

The comparator 32 is preferably a high-gain differential amplifier having its non-inverting input (+) coupled by the probe 5 to the external signal being monitored. Preferably, a potentiometer 35 is connected to the inverting input (−) so as to set a variable switching threshold for the comparator. This facilitates the sensing of different external signals having widely varying voltage magnitudes. Advantageously, the opposite ends of the potentiometer can be switched to connect to an external power supply.

In FIG. 5, a representative pattern defined by the input signal (IN) is shown in relation to the sampling operation. In the selected example, the signal IN has a binary value of '0' during an interval of time beginning before T0 and ending between T7 and T8, and also during an interval of time between T24 and T31. During the other depicted intervals of time it has a binary value of '1'. In this example then, the T side output of flip-flop 18 ($E_S$) switches from '0' to '1' at time T8, switches back to '0' at time T24, and switches to '1' at time T31.

The flip-flop 19i has the same characteristics as the flip-flop 18. This flip-flop serves as the input circuit for the transition detector 19 (FIG. 1). It has its S and R inputs respectively connected to the T and F outputs of the flip-flop 18. The T side output of the flip-flop 19i defines a signal $E_D$ shown in FIG. 5. The signal $E_D$ is simply a delayed version of the signal $E_S$. While not illustrated in FIG. 5, it will be appreciated that the signal $\overline{E}_D$, defined at the F side output of flip-flop 19i, is similarly a delayed version of the signal $\overline{E}_S$, defined at the F side of the flip-flop 18.

Preferably, an exclusive-OR gate 19o serves as the output circuit for the transition detector. The output signal produced by the gate 19o ($E_T$) is a '1' (i.e., +5 volts) if one or the other of its input signals is a '1' but not if both are. The signals $E_S$ and $E_D$ are applied as the inputs to the gate 19o. As a result of the foregoing arrangement, each time the signal $E_S$ changes in logical value, whether from or to a '1', then the signal $E_T$ changes to a '1' where it remains for a full clock period whereupon it changes back to a '0' owing to the delayed following of the signal $E_S$ by the signal $E_D$. Thus, the signal $E_T$ is at the logical '1' value only at such times as transitions are detected in the input signal IN; that is, during the times between T8 and T9, between T24 and T25, and between T31 and T32.

Preferably, signal conditioning circuitry 17 provides synchronizing signals that are useful in various modes of operation. For example, a single sweep operation, free-running operation, and normal trigger operation are selectable. Also, sweep triggering, both for single operation and for normal triggering operation, can be synchronized either to '0' to '1' or to '1' to '0' transitions in the external input signal.

An AND gate 37 provides a - sync signal (FIG. 5) that assumes a '1' value to indicate a '1' to '0' transition and AND gate 39 provides a + sync signal (FIG. 5) that assumes a '1' value to indicate a '1' to '0' transition. These signals are respectively coupled to the display sweep circuitry 14 by signal leads 41 and 43 (not shown in FIG. 1). AND gate 37 responds to the signals $E_T$ and $\overline{E}_S$, and AND gate 39 responds to the signals $E_T$ and $E_S$. In the exemplary timing diagram of FIG. 5, the + sync signal is shown at the '1' level between times T8 and T9 and also between times T31 and T32, whereas the − sync signal is shown at the '1' level between times T24 and T25.

Figure 4B:
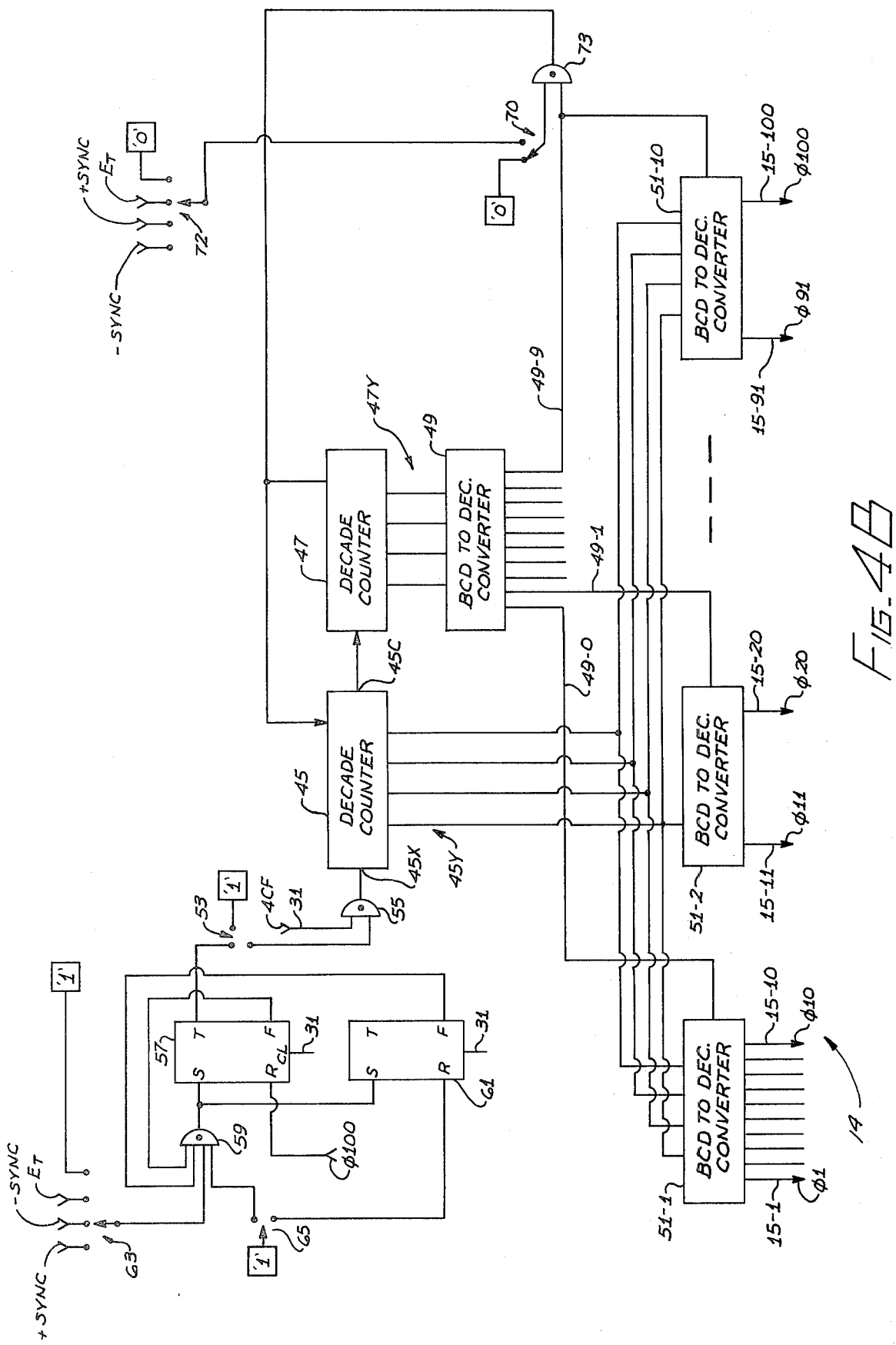

In FIG. 4B there is shown the presently preferred construction of the display sweep circuitry 14 for a specific embodiment in which there are provided 100 display circuits per row of the display 10.

The circuitry 14 includes to conventional decade binary counters 45 and 47 that are cascaded. The counter 45 has an input 45X for receiving pulses to be counted, a parallel output 45Y on which it provides a binary coded decimal (BCD), 4-bit parallel signal indicative of its present count, and a carry-out output 45C on which it provides pulses causing the decade counter 47 to increment.

The decade counter 47 has a parallel output 47Y on which it provides a BCD, 4-bit parallel signal indicative of its count.

A conventional BCD to decimal converter 49 decodes the count of the counter 47. It indicates the present count of the counter 47 by providing a '1' on a selected one of ten output signal leads 49-0 through 49-9 (not all shown). Thus, as the decade counter 47 sequentially counts from decimal 0 to decimal 9, there is a '1' sequentially applied to the signal leads 49-0 through 49-9 one at a time.

Each of the lines 49-0 through 49-9 is connected to the enable input of a respective one of ten BCD to decimal converters 51-1 through 51-10. Each of these converters, when enabled, decodes the count of the counter 45. To provide an indication of the decoded count, the enabled converter applies a '1' to a selected one of ten output signal leads that form part of the bus 15. Thus, as the cascaded decade counters 45 and 47 sequentially count from decimal 0 to decimal 99, there is a '1' sequentially applied to the signal leads 15-1 through 15-100 one at a time.

Owing to this arrangement, the signal leads of the bus 15 carry in parallel a plurality of time-varying, binary-valued control signals. With respect to the display circuits, each of these control signals has a half-select value. FIG. 5 shows a representative pair of these control signals ($\phi 1$ and $\phi 2$). The $\phi 1$ signal is carried by the signal lead 15-1 and the $\phi 2$ signal is carried by the signal lead 15-2.

The circuitry 14 preferably includes various switches whose settings determine the mode of operation. A switch 53 is a two-position switch that connects the input of an AND gate 55 either to a continuous source of '1' (for normal mode triggering) or to the T-side output of a flip-flop 57 (for single-sweep mode triggering). The AND gate 55 has another input connected via the signal lead 31 to receive the 4CF pulse train. Thus, for normal mode triggering, the output of AND gate 55 copies the 4CF signal continuously. This output serves as the input pulse train to the decade counter 45. For single-sweep mode, the output of AND gate 55 copies the 4CF pulse train only during such time as the flip-flop 57 is in its set state.

The flip-flop 57 has a clock input connected via the lead 31 to receive the 4CF pulse train, an S input connected to the output of an AND gate 59, and an R input connected to receive the $\phi 100$ signal. The AND gate 59 has four inputs that are connected respectively to the F-side output of the flip-flop 57, the F-side output of a flip-flop 61, the wiper arm of a single-pole, four-position switch 63, and to a normally-open contact of a switch 65.

By manually closing the switch 65, the single-sweep operation is commenced. Before commencement, the AND gate 59 applies a '0' to the S inputs of the flip-flops 57 and 61. Both flip-flops 57 and 61 are in the reset state. After closing of the switch 65, as soon as there appears a synchronizing pulse in the signal selected by the switch 63 (i.e., either + sync, − sync, $E_T$, or a continuous '1'), then flip-flops 57 and 61 are triggered into their set states by the next clock pulse. Accordingly, the F-side output of flip-flop 61 switches to '0' so that AND gate 59 is temporarily disabled from responding to subsequent pulses in the selected synchronizing signal. Flip-flop 61 remains set until the switch 65, a form-C contact, returns to the off position.

Two other switches involved in mode control are switches 70 and 72. The switch 70, for normal mode, connects a source of a continuous '0' to an input of an AND gate 73. The output of AND gate 73 is connected to reset or clear inputs of the decade counters 45 and 47. During single-sweep mode, the AND gate 73 output remains '0' and the counters are not externally cleared so they each recycle only after proceeding through a full count of 100 pulses.

As to normal mode, owing to the interconnection of the switches 70 and 72, one input of AND gate 73 receives either + sync, − sync, $E_T$, or a continuous '0' (for free-run operation). The other input of AND gate 73 is connected to the signal lead 49-9 which carries a '1' only during the last portion of a sweep. The coincidence of a '1' on lead 49-9 and a pulse in the selected synchronizing signal thus enables the AND gate 73 to clear the decade counters.

Consider now the display 10'' shown in FIG. 3. Within display 10'' there are a plurality of LED's 12 that are arranged in a matrix which preferably has four rows. Each LED in the first row is resistively coupled to the T output of a corresponding one of a plurality of flip-flops 80-1,1 through 80-1,$n$. Each of these flip-flops has a direct set input (sometimes called a preset input) and a direct reset input (sometimes called a clear input). Each has its S input connected to the output of a corresponding one of a plurality of AND gates 81-1,1 through 81-1,$n$. Each has its R input connected to the output of a corresponding one of a plurality of OR gates 82-1,1 through 82-1,$n$.

The LED's forming the second and third rows are commonly driven, column-by-column, by the T outputs of flip-flops 83-1 through 83-$n$. Each of these flip-flops has its S input connected to the output of a corresponding one of a plurality of AND gates 85-1 through 85-$n$. Each has its R input connected to the output of a corresponding one of a plurality of OR gates 86-1 through 86-$n$.

Each LED in the fourth row is resistively coupled to the T output of a corresponding one of a plurality of flip-flops 80-4,1 through 80-4,$n$. Each of these flip-flops has its S input connected to the output of a corresponding one of a plurality of AND gates 81-4,1 through 81-4,$n$. Each has its R input connected to the output of a corresponding one of a plurality of OR gates 82-4,1 through 82-4,$n$.

As indicated by the block labeled 11'', the following circuit elements form a representative display circuit within the display 10''. The LED 12-1,1; flip-flop 80-1,1 and the resistor coupling it to the LED; the AND gate 81-1,1; and the OR gate 85-1,1. The AND gate 81-1,1 has two inputs that serve as input terminals for the display circuit. One input is coupled to receive a gating signal (i.e., $E_S$) from the signal conditioning circuitry 17; the other input is coupled to receive a control signal ($\phi 1$) from the display sweep circuitry via the signal lead 15-1.

While the display 10'' is somewhat more complex than the display 10', it is presently preferred because it provides persistence. It is desirable to provide effective persistence for the entire sweep. That is, as the sweep progresses column-by-column across the display, each LED that has been caused to emit light continues to do so until its corresponding display circuit is reset.

Each flip-flop that drives an LED, once set, causes the corresponding LED to have persistence until the flip-flop is reset.

A push-button 101 provides manual control for simultaneously resetting all the flip-flops. This is particularly useful in connection with the single-sweep mode. The push-button 101, when closed, couples a source of a logical '1' to each of the OR gates in the display circuits which respond by resetting the flip-flops.

Consider now the resetting operation that is involved in repetitive sweeps. On a column-by-column basis, the display circuits for the first and fourth rows are interconnected. For example, the output of the AND gate 81-1,1, which provides for setting flip-flop 80-1,1, is also connected to one input of OR gate 82-4,1, which provides for resetting the flip-flop 80-4,1. An identical interconnection is provided between the output of AND gate 81-4,1 and the input of OR gate 82-1,1. Thus, as one flip-flop is set, the other is reset.

As to resetting the flip-flops that commonly drive the second and third rows, this is effected through the coincidence detection by AND gates 90-1 through 90-n. Each of these AND gates receives an $\bar{E}_T$ signal from an inverter 95 and also receives a respective one of the control signals $\phi 1$ through $\phi n$.

What is claimed is:

1. Apparatus for providing a progressive display of a pulse pattern being defined by a time-varying, binary-valued electrical input signal, which comprises:
   a display including a plurality of electrically-controllable illuminative elements arranged in a matrix having at least first and second rows and a plurality of columns;
   a source of sequentially occurring pulses;
   display sweep circuitry including circuit means responsive to the pulses for generating in parallel a plurality of time-varying, binary-valued control signals that together define a column addressing signal that one-by-one identifies each column;
   means, including an electrical probe sensing the electrical input signal and a bi-level sensing circuit responsive thereto, for providing a row addressing signal that varies in time in accordance with the electrical input signal to identify the first row when a first binary value is sensed and to identify the second row when a second, opposite binary value is sensed; and
   circuit means responsive to the row addressing signal and the column addressing signal for causing illuminative elements to light when both the row and column in which they are arranged are identified so as to produce a visual display corresponding to the pulse pattern being defined by the input signal.

2. Apparatus according to claim 1 wherein each illuminative element is a light emitting diode.

3. Apparatus according to claim 1 wherein the bi-level sensing circuit includes a comparator circuit having an adjustable switching threshold for adapting the sensing circuit to different input signals having varying voltage levels.

4. Apparatus according to claim 1 wherein the display sweep circuitry includes counting register means clocked by pulses coupled to it from the source of pulses, and decoding circuitry responsive to the register means for providing the control signals defining the column addressing signal.

5. Apparatus for displaying a pulse pattern defined by a time-varying, binary-valued electrical input signal, which comprises:
   a display including a plurality of electrically-controlled illuminative elements arranged in a matrix having at least first and second rows and a plurality of columns, each element being electrically connected into a respective one of a plurality of display circuits, each display circuit having first and second terminals and causing its element to light in response to the coincidence of half-select values of signals coupled to its terminals;
   a source of sequentially occurring pulses;
   display sweep circuitry including circuit means responsive to the pulses for generating in parallel a plurality of time-varying, binary-valued control signals, each control signal having a half-select value as one of its binary values, the first terminals of the display circuits in each column being coupled to receive a respective one of the control signals;
   means, including an electrical probe sensing the electrical input signal and a bi-level sensing circuit responsive thereto, for providing in parallel first and second binary-valued gating signals, the first gating signal assuming a half-select value each time a first binary value is sensed and the second gating signal assuming a half-select value each time a second, opposite binary value is sensed; and
   the second terminal of each display circuit in the first row being coupled to receive the first gating signal, and the second terminal of each display circuit in the second row being coupled to receive the second gating signal.

6. Apparatus according to claim 5 wherein each illuminative element is a light emitting diode and wherein each display circuit provides for forward biasing a corresponding light emitting diode in response to the coincidence of the half-select values.

7. Apparatus according to claim 6 wherein each display circuit includes a series circuit between its two terminals, the series circuit including a resistor and a light emitting diode, and wherein the half-select value of each control signal is defined by a first voltage level and the half-select value of each gating signal is defined by a second voltage level, the first and second voltage levels differing by an amount sufficient to forward bias the light emitting diode.

8. Apparatus according to claim 6 wherein each display circuit includes a memory circuit having first and second states, the corresponding light emitting diode being coupled to the memory circuit and being forward biased in response to the first state, the memory circuit being set to the first state in response to the coincidence of half-select values of the control and gating signals coupled to the corresponding display circuit.

9. Apparatus according to claim 5 and further comprising:
   circuit means for detecting transitions in the input signal and, in response, providing a third binary-valued, time-varying gating signal; and
   a third row of elements in said matrix for displaying an indication of the detected transitions in accordance with the third gating signal and the control signals.

10. Apparatus according to claim 5 wherein the bi-level sensing circuit includes a comparator circuit having an adjustable switching threshold for adapting the sensing circuit to different input signals having varying voltage levels.

11. Apparatus according to claim 5 wherein the display sweep circuitry includes register means clocked by pulses coupled to it from the source of pulses and means for controlling the register means to define a single sweep whereby one-by-one the control signals for the respective columns sequentially assume their half-select value.

* * * * *